(12) United States Patent
Kubo et al.

(10) Patent No.: US 10,281,900 B2
(45) Date of Patent: May 7, 2019

(54) NUMERICAL CONTROLLER WITH SUBMERSION PROTECTION CIRCUIT

(71) Applicant: FANUC Corporation, Minamitsuru-gun, Yamanashi (JP)

(72) Inventors: Yoshiyuki Kubo, Minamitsuru-gun (JP); Masahiro Saeki, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 120 days.

(21) Appl. No.: 15/017,830

(22) Filed: Feb. 8, 2016

(65) Prior Publication Data

US 2016/0239016 A1  Aug. 18, 2016

(30) Foreign Application Priority Data

Feb. 13, 2015  (JP) .................................. 2015-026338

(51) Int. Cl.
*G05B 9/02* (2006.01)
*G05B 19/406* (2006.01)

(52) U.S. Cl.
CPC .. *G05B 19/406* (2013.01); *G05B 2219/34315* (2013.01)

(58) Field of Classification Search
CPC ........ G05B 19/406; G05B 2219/34315; G06F 11/004; G06F 11/0709; G06F 11/0754; G06F 11/079; G06F 11/1441; G06F 11/1461; G06F 11/3058; G06F 21/554;

(Continued)

(56) References Cited

U.S. PATENT DOCUMENTS

| 7,309,216 | B1 * | 12/2007 | Spadola, Jr. ............ F04B 49/02 417/18 |
| 7,557,466 | B2 * | 7/2009 | Wong ..................... H02H 5/083 307/118 |
| 9,110,848 | B1 * | 8/2015 | Kim ..................... G06F 11/0709 |

(Continued)

FOREIGN PATENT DOCUMENTS

| CN | 201749358 U | 2/2011 |
| CN | 202916635 U | 5/2013 |

(Continued)

OTHER PUBLICATIONS

Decision to Grant a Patent dated Jan. 31, 2017 in Japanese Patent Application No. 2015-026338 (3 pages) with an English Translation (3 pages).

(Continued)

*Primary Examiner* — Thomas C Lee
*Assistant Examiner* — Zhipeng Wang
(74) *Attorney, Agent, or Firm* — Drinker Biddle & Reath LLP

(57) ABSTRACT

A numerical controller includes: a monitor unit that monitors a water level; a backup unit that performs power supply when a main power source is turned off; and a cutoff circuit that cuts off the power supply, and when the water level monitored by the monitor unit detects a predetermined water level, the power source of the backup unit from an external power source means is cut off. Thus, the power supply is cut off before the flooding occurs in the numerical controller, which makes it possible to reduce the damage caused by electrolytic corrosion.

4 Claims, 3 Drawing Sheets

(58) Field of Classification Search
CPC ..... G06F 21/57; G06F 2201/81; G07C 5/008; G07C 5/0891; G08B 25/016; G08G 1/205
See application file for complete search history.

(56) References Cited

U.S. PATENT DOCUMENTS

| | | | | | |
|---|---|---|---|---|---|
| 2007/0061598 | A1* | 3/2007 | Bitton | ................... | G06F 21/70 713/194 |
| 2010/0175762 | A1* | 7/2010 | Anacrelico | ........... | A47L 15/421 137/387 |
| 2012/0079291 | A1* | 3/2012 | Yang | ................ | G06F 1/263 713/300 |
| 2013/0088094 | A1* | 4/2013 | Paik | ................ | H04M 1/18 307/118 |
| 2014/0307356 | A1* | 10/2014 | Hong | ................... | H02H 5/083 361/78 |
| 2014/0375446 | A1* | 12/2014 | Wanami | ............... | G07C 5/0891 340/436 |
| 2016/0004283 | A1* | 1/2016 | Ganguly | ............... | G06F 1/1656 307/118 |

FOREIGN PATENT DOCUMENTS

| | | |
|---|---|---|
| JP | H04-205005 A | 7/1992 |
| JP | H07-271683 A | 10/1995 |
| JP | 2005-269848 A | 9/2005 |
| JP | 2005-311637 A | 11/2005 |
| JP | 2008-158762 A | 7/2008 |
| JP | 2012-074798 A | 4/2012 |

OTHER PUBLICATIONS

The Notification of the First Office Action dated Jan. 10, 2018 in Chinese Patent Application No. 2016100838130 (5 pages) with an English translation (7 pages).

\* cited by examiner

NUMERICAL CONTROLLER WITH SUBMERSION PROTECTION CIRCUIT

RELATED APPLICATION DATA

This application claims priority under 35 U.S.C. § 119 and/or § 365 to Japanese Application No. 2015-026338 filed Feb. 13, 2015, the entire contents is incorporated herein by reference.

BACKGROUND OF THE INVENTION

1. Field of the Invention

The present invention relates to a numerical controller that controls a machine tool or a robot. Particularly, the present invention relates to a numerical controller with a protective circuit at the time of submersion.

2. Description of the Related Art

Generally, when a printed circuit board to which a voltage is applied is submerged, electrolytic corrosion may occur in wiring and electrical components of the printed circuit board. When the electrolytic corrosion advances by submersion for a long period of time, this leads to disconnection of the wiring, and there is a need for exchange of the printed circuit board for restoration. However, as long as the voltage is not applied even when the printed circuit board is submerged, it is possible to reduce the damage caused by the electrolytic corrosion. JP 2005-311637 A discloses a technique for cutting off the voltage supply when detecting the water wetting in a portable terminal.

Further, there are also cases where data of a memory is lost due to the submersion. When the data of the memory is lost, it is necessary to re-enter the program, parameters and the like for restoration, and it takes time to restore the data. To facilitate the restoration from the memory data loss, it is necessary to leave the backup data. JP 2008-158762 A discloses a technique for retracting the data of the memory to an external server via a LAN, when detecting the water wetting in the mobile terminal.

At the time of an occurrence of flood damage caused by flooding of the river, tidal waves or the like, in some cases, the numerical controller is submerged. Generally, even when the numerical controller is submerged, it is possible to restore the numerical controller by washing it with fresh water. However, electrolytic corrosion occurs in wiring portions of the component and the printed circuit board to which the voltage is applied at the time of submersion, and in particular, in some cases, when the submersion time is a long, the wiring portions of the printed circuit board lead to disconnection. In this case, for example, even when performing the washing, it is not possible to restore the wiring portions since it leads to disconnection, it is necessary to replace the numerical controller, and thus it takes time to restore the numerical controller.

Meanwhile, even when the numerical controller is restored, in some cases, the internal memory data of the numerical controller is lost. In this case, if backup of the memory data is regularly performed, it is possible to return the memory data to the state before submersion by restoring the backed-up memory data. However, when the latest memory data is not backed up, it is necessary to re-enter the program or parameters, and thus, it takes time to recover the memory date.

Techniques disclosed in JP 2005-311637 A and JP 2008-158762 A are all related to a mobile terminal. In contrast, since a machine tool in which a numerical controller is used is generally greater than a mobile terminal, a time to some extent is required until the entire machine tool is submerged even when flood damage occurs. In addition, since water such as working fluid generally falls on a machine tool or a numerical controller under the environment in which the machine tool is installed, shutting the system down each time makes the production efficiency fall. Unlike a mobile terminal disclosed in JP 2005-311637 A and JP 2008-158762 A, since the numerical controller is often not connected to an external server, the retreat of the memory data may also become difficult.

Although a main power source is turned on when the numerical controller is running, when the numerical controller is not running, the main power source is cut off and is usually turned off. Further, the submergence of the numerical controller at the time of occurrence of flood damage may occur regardless of whether the main power source is turned on or turned off. Here, although the power source is required to perform operations such as the water wetting detection, disconnection of the battery and retreat of the memory data, in a case where the submergence of the numerical controller occurs at the time of turning-off of the main power source, since the supply of the power source is not performed, a situation of failing to perform the operations such as the water wetting detection, the disconnection of the battery and the retreat of the memory data is considered.

SUMMARY OF THE INVENTION

Thus, an object of the present invention is to provide a numerical controller that detects a rise in the water level to facilitate restoration from submersion, independent of the state of the main power source.

A numerical controller according to the present invention includes: a monitor unit that monitors a water level; a backup unit that performs power supply when a main power source is turned off; a storage unit having a memory that receives the power supply from the backup unit; and a cutoff control unit, wherein the backup unit has an external power source means for supplying a backup power source, and a cutoff circuit that cuts off the power supply from the external power source means, the backup unit supplies the power source to the monitor unit, the storage unit and the cutoff control unit, the cutoff control unit performs at least a control of the cutoff circuit, and when the monitor unit detects a first water level, the cutoff control unit controls the cutoff circuit to cut off the power supply from the external power source means.

Thus, since the power source is cut off before the flooding occurs in the numerical controller, it is possible to reduce the damage caused by electrolytic corrosion.

The storage unit may further include a nonvolatile memory, the cutoff control unit may further also control the storage unit, and when the monitor unit detects a second water level, the cutoff control unit may retreat the data stored in the memory to the nonvolatile memory.

Thus, since the data stored in the memory is held by the nonvolatile memory, it is possible to easily restore the data when performing the restoration from the time of flooding.

The numerical controller may further include a report unit that performs a report to the outside, wherein when the monitor unit detects a third water level, the cutoff control unit may perform a command of a report to the report unit, and when the monitor detects a fourth water level, the cutoff control unit may turn off the main power source.

Thus, by performing a report to an operator depending on the water level or by also turning off the main power source when flooding occurs at the time of turning-on of the main power source, it is possible to reduce the damage caused by electrolytic corrosion or perform a report to the operator.

According to the present invention, it is possible to provide a numerical controller that detects a rise in the water level to facilitate restoration from submersion, independently of the state of the main power source.

BRIEF DESCRIPTION OF THE DRAWINGS

Aforementioned and other objects and features of the present invention will become apparent from the description of following examples with reference to the accompanying drawings.

DETAILED DESCRIPTION OF THE PREFERRED EMBODIMENTS

First Embodiment

Hereinafter, embodiments of the present invention will be described referring to the accompanying drawings.

Figure 1:
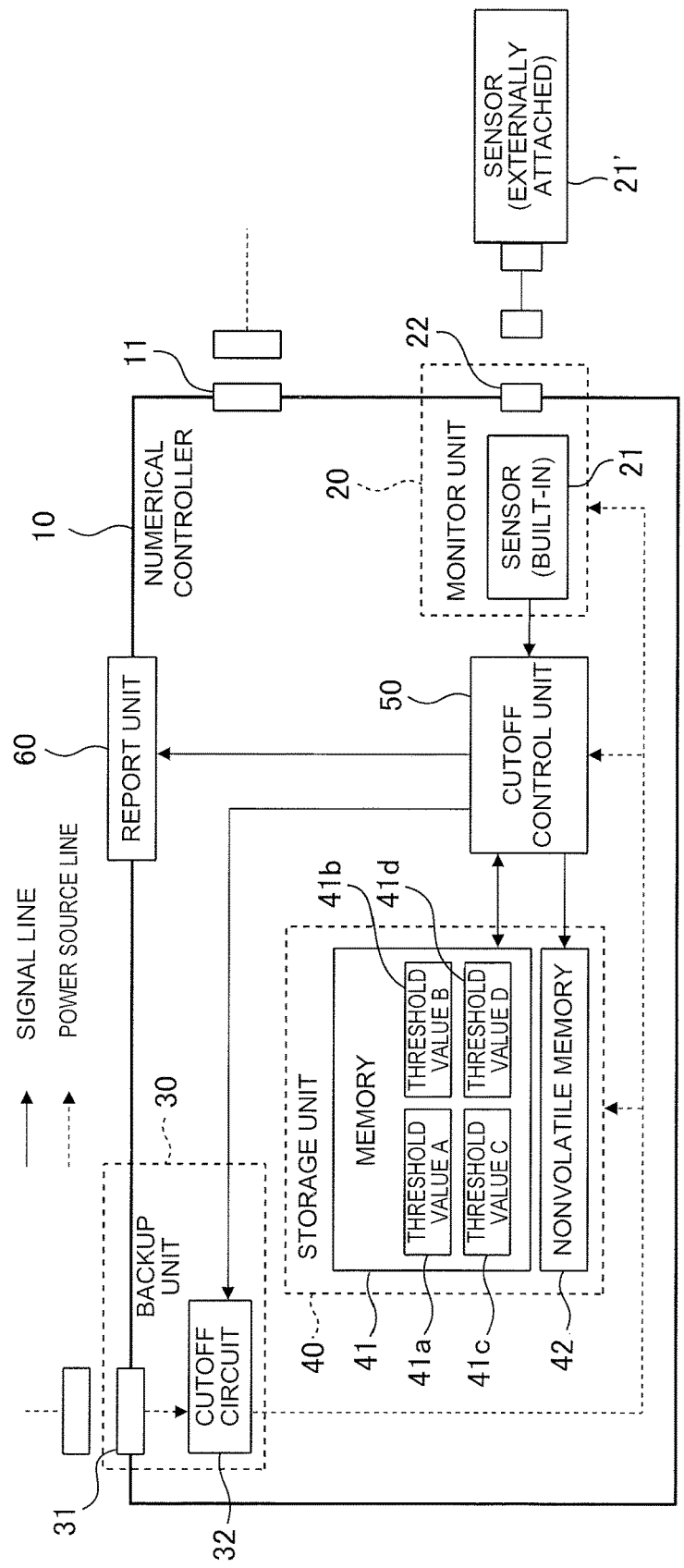
FIG. 1 is a block diagram illustrating a configuration of a numerical controller of an embodiment of the present invention.

FIG. 1 is a block diagram illustrating a configuration of a numerical controller of an embodiment of the present invention. A numerical controller 10 has a main power source 11, a monitor unit 20 that monitors a rise in the water level, a backup unit 30 that supplies the backup power source for holding a memory 41 when turning off the main power source 11 of the numerical controller 10, a storage unit 40 that stores programs and parameters of the numerical controller 10, a cutoff control unit 50 that performs retreat of the data stored in the memory 41 when detecting the rise in the water level and the cutoff of the power source from the backup unit 30, and a report unit 60 that performs a report to an operator. Here, the power source is supplied to the monitor unit 20, the storage unit 40 and the cutoff control unit 50 from the backup unit 30 when turning off the main power source 11.

The monitor unit 20 monitors the water level of a water level sensor 21 that is built in the numerical controller 10. Although the monitoring of the water level using the monitor unit 20 may be capable of detecting whether the water level exceeds one set level, it is preferred to set a plurality of set levels and to be capable of detecting whether the water level exceeds the respective set levels. Further, the present embodiment is configured so that the water level sensor 21 is built in the numerical controller 10 and the monitor unit 20 monitors the water level of the water level sensor 21. Instead of monitoring the water level of the built-in water level sensor 21, it is also possible to provide a water level sensor 21' on the outside, to connect the numerical controller 10 with the water level sensor 21' by a connector 22 provided in the numerical controller 10 and to monitor the water level of the external water level sensor 21' by the monitor unit 20. Further, as a means for detecting at least two or more water levels, two or more water levels may be detected by providing two or more water level sensors, and a single water level sensor capable of detecting a plurality of water levels may be provided.

The backup unit 30 has an external power source means 31 that connects the battery or the external power source, and a cutoff circuit 32 that cuts off the supply of the backup power source for holding the memory 41 when turning off the main power source of the numerical controller 10. Until the previous stage of the cutoff circuit 32, since the voltage is applied by the power supply of the external power source means 31, there is a risk of an occurrence of electrolytic corrosion due to flooding. Therefore, a method of preventing the electrolytic corrosion by applying a waterproof measure in the backup unit 30 is considered. Further, as the countermeasure when the electrolytic corrosion occurs without performing a waterproof measure, a method of facilitating the replacement is also considered. As the method, there is a method of having a connector that allows the backup unit 30 to be separated from the numerical controller 10 in a subsequent stage of the cutoff circuit 32, or including a separate cutoff circuit in a battery, an external power source or the like.

The storage unit 40 has a memory 41 capable of backing up the stored contents by the power supply from the backup unit 30, and a nonvolatile memory 42 that can hold the stored contents irrespectively of presence or absence of the power supply. Threshold value data (41*a*, 41*b*, 41*c* and 41*d*) for performing a control depending on the water level is stored in the memory 41.

The report unit 60 is a means for performing a report or issuing an alarm to the outside. Specifically, it is possible to use a means such as a buzzer for performing a report by sound, a means such as a lamp or a display device for performing a report by the display, and a means such as a communication device for performing a report by performing communication to the outside. In the monitor unit 20, when detecting a rise in the water level of the water level sensor 21, a command of the report from the cutoff control unit 50 to the report unit 60 is performed, and the report unit 60 which has received the command issues an alarm.

In the numerical controller 10, when the main power source 11 is turned on, the main power source 11 supplies the power source and performs the power source supply to the monitor unit 20, the storage unit 40, the cutoff control unit 50 and the report unit 60. Further, the supply of the power source of the main power source 11 may be performed by the main power source 11 itself, and the power source may be supplied from the outside, by being connected to the external power source using a connector (not illustrated) provided with the main power source 11. When the main power source is turned off, the supply destination of the power source is switched into the external power source means 31 of the backup unit 30 to perform the power source supply to the monitor unit 20, the storage unit 40, the cutoff control unit 50, the report unit 60 or the like from the external power source means 31 of the backup unit 30. Further, instead of switching the supply destination of the power source into the external power source means 31 of the backup unit 30 by tuning on/off of the main power source 11, a configuration may be adopted in which the power source supply is received from both of the main power source 11 and the external power source means 31 of the backup unit 30 when the main power source 11 is turned on, and the power source supply is received only from the external power source means 31 of the backup unit 30 when the main power source 11 is turned off.

Figure 2:
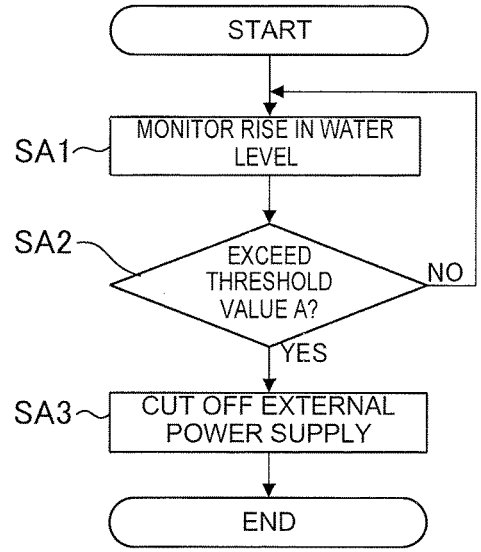
FIG. 2 is a flowchart illustrating a flow of a process in a first embodiment.

FIG. 2 is a flowchart illustrating a flow of a process in this embodiment. Hereinafter, the process will be described step by step.

(Step SA1) In the monitor unit 20, the value of the water level of the water level sensor 21 is monitored.

(Step SA2) In the monitor unit 20, the value of the water level of the water level sensor 21 is compared to a threshold value data A (41a) in the memory 41 to determine whether the value of the water level of the water level sensor 21 exceeds the threshold value data A. When exceeding the threshold value data (YES), the process proceeds to step SA3, and when not exceeding the threshold value data (NO), the process returns to step SA1 to continuously monitor the value of the water level of the water level sensor 21.

(Step SA3) A command is given to the cutoff circuit 32 of the backup unit 30 from the cutoff control unit 50, and the power supply from the external power source means 31 of the backup unit 30 is cut off and finished.

Second Embodiment

The present embodiment is different from the first embodiment in that, when the water level rises, in addition to cutting off the supply of the power source from the external power source means 31 of the backup unit 30, the storage contents stored in the memory 41 are retracted to the nonvolatile memory 42.

Figure 3:
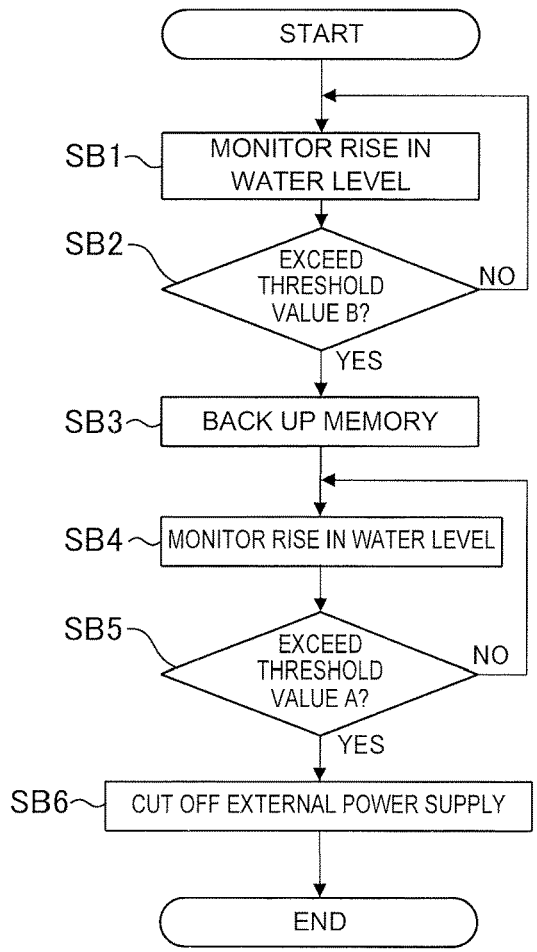
FIG. 3 is a flowchart illustrating the flow of a process in a second embodiment.

FIG. 3 is a flowchart illustrating a flow of a process in this embodiment. Hereinafter, the process will be described step by step.

(Step SB1) In the monitor unit 20, the value of the water level of the water level sensor 21 is monitored.

(Step SB2) In the monitor unit 20, the value of the water level of the water level sensor 21 is compared to a threshold value data B (41b) in the memory 41 to determine whether the value of the water level of the water level sensor 21 exceeds the threshold value data B. When exceeding the threshold value data (YES), the process proceeds to step SB3, and when not exceeding the threshold value data (NO), the process returns to step SB1 to continuously monitor the value of the water level of the water level sensor 21.

(Step SB3) A command is given to the storage unit 40 from the cutoff control unit 50, and the storage contents stored in the memory 41 are retracted to the nonvolatile memory 42.

(Step SB4) In the monitor unit 20, the value of the water level of the water level sensor 21 is monitored.

(Step SB5) In the monitor unit 20, the value of the water level of the water level sensor 21 is compared to a threshold value data A (41a) in the memory 41 to determine whether the value of the water level of the water level sensor 21 exceeds the threshold value data A. When exceeding the threshold value data (YES), the process proceeds to step SB6, and when not exceeding the threshold value data (NO), the process returns to step SB4 to continuously monitor the value of the water level of the water level sensor 21.

(Step SB6) A command is given to the cutoff circuit 32 of the backup unit 30 from the cutoff control unit 50, and the power supply from the external power source means 31 of the backup unit 30 is cut off and finished.

In the threshold value data A (41a) and the threshold value data B (41b) of this embodiment, the threshold value data A is set to a higher water level than the threshold value data B, and after performing the backup of the memory in comparison with the threshold value data B, the power supply from the external power source means of the backup unit in comparison with the threshold value data A is cut off.

Third Embodiment

This embodiment is different from the other embodiments in that, when the water level rises, an alarm is performed in the report unit 60 or the main power source 11 is turned off.

Figure 4:
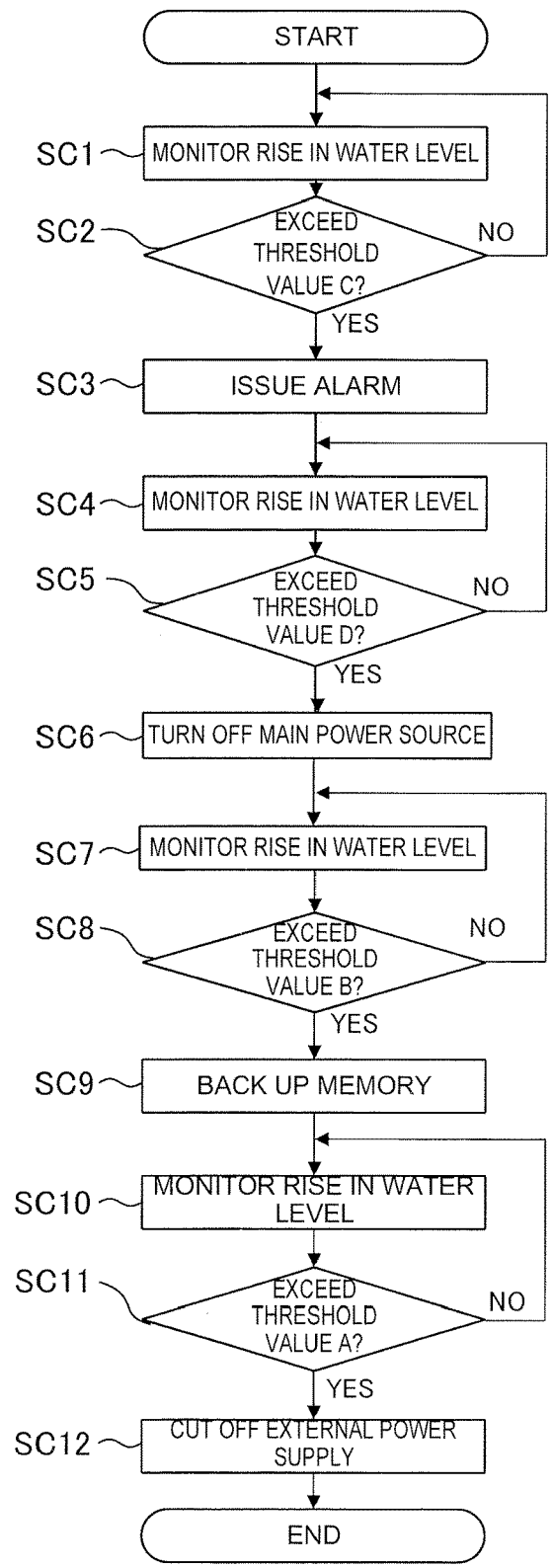
FIG. 4 is a flowchart illustrating the flow of a process in a third embodiment.

FIG. 4 is a flowchart illustrating a flow of a process in this embodiment. Hereinafter, the process will be described step by step.

(Step SC1) In the monitor unit 20, the value of the water level of the water level sensor 21 is monitored.

(Step SC2) In the monitor unit 20, the value of the water level of the water level sensor 21 is compared to the threshold value data C (41c) in the memory 41 to determine whether the value of the water level of the water level sensor 21 exceeds a threshold value data C. When exceeding the threshold value data (YES), the process proceeds to step SC3, and when not exceeding the threshold value data (NO), the process returns to step SC1 to continuously monitor the value of the water level of the water level sensor 21.

(Step SC3) A command is given to the report unit 60 from the cutoff control unit 50, and an alarm is performed in the report unit 60.

(Step SC4) In the monitor unit 20, the value of the water level of the water level sensor 21 is monitored.

(Step SC5) In the monitor unit 20, the value of the water level of the water level sensor 21 is compared to the threshold value data D (41d) in the memory 41 to determine whether the value of the water level of the water level sensor 21 exceeds the threshold value data D. When exceeding the threshold value data (YES), the process proceeds to step SC6, and when not exceeding the threshold value data (NO), the process returns to step SC4 to continuously monitor the value of the water level of the water level sensor 21.

(Step SC6) The main power source 11 of the numerical controller 10 is turned off.

(Step SC7) In the monitor unit 20, the value of the water level of the water level sensor 21 is monitored.

(Step SC8) In the monitor unit 20, the value of the water level of the water level sensor 21 is compared to the threshold value data B (41b) in the memory 41 to determine whether the value of the water level of the water level sensor 21 exceeds the threshold value data B. When exceeding the threshold value data (YES), the process proceeds to step SC9, and when not exceeding the threshold value data (NO), the process returns to step SC7 to continuously monitor the value of the water level of the water level sensor 21.

(Step SC9) A command is given to the storage unit 40 from the cutoff control unit 50, and the storage contents stored in the memory 41 are retracted to the nonvolatile memory 42.

(Step SC10) In the monitor unit 20, the value of the water level of the water level sensor 21 is monitored.

(Step SC11) In the monitor unit 20, the value of the water level of the water level sensor 21 is compared to the threshold value data A (41a) in the memory 41 to determine whether the value of the water level of the water level sensor 21 exceeds the threshold value data A. When exceeding the threshold value data (YES), the process proceeds to step SC12, and when not exceeding the threshold value data (NO), the process returns to step SC10 to continuously monitor the value of the water level of the water level sensor 21.

(Step SC12) A command is given to the cutoff circuit 32 of the backup unit 30 from the cutoff control unit 50, and the power supply from the external power source means 31 of the backup unit 30 is cut off and finished.

A magnitude relation of the threshold value data A (41*a*), the threshold value data B (41*b*), the threshold value data C (41*c*) and the threshold value data D (41*d*) is set to be the threshold value data A (41*a*)>the threshold value data B (41*b*)>the threshold value data D (41*d*)>the threshold value data C (41*c*) in this embodiment, but it is not limited thereto. It is preferred to set the threshold value data A (41*a*) to the highest water level and to finally cut off the power supply from the external power source means of the backup unit. However, in other threshold value data, it is possible to determine the appropriate magnitude relation, and for example, it is possible to appropriately change the threshold value data, such as setting the threshold value data D (41*d*) as the lowest water level to first turn the main power source off, or setting the threshold value data B (41*b*) as the lowest water level to first back up the memory.

Further, it is not necessary to use all of the threshold value data B (41*b*), the threshold value data C (41*c*) and the threshold value data D (41*d*), and it is also possible to use only one threshold value data as required. For example, it is possible to appropriately combine the threshold value data, such as the report of the alarm, turning-off of the main power source and cutting-off of the power supply from the external power source means of the backup unit, only using the threshold value data C (41*c*) and the threshold value data D (41*d*).

The invention claimed is:

1. A numerical controller, the numerical controller including a processor and a memory having instructions stored therein, when executed by the processor, perform a method comprising:

detecting, using a water level sensor, a water level;
   supplying power to the numerical controller, via a main power source, when the main power source is turned on; and
   supplying power to the numerical controller, via a backup power source, when the main power source is turned off,
   wherein the memory and the water level sensor receive power from the backup power source when the main power source is turned off,
   wherein the memory and the water level sensor receive power from the main power source when the main power source is turned on,
   wherein when the water level sensor detects a second first water level, the main power source is turned off, and
   wherein, after the water level sensor detects the first water level and when the water level sensor detects a second water level, power from the backup power source is cutoff, the first water level being less than the second water level.

2. The numerical controller according to claim 1, wherein after the water level sensor detects the first water level and when the water level sensor detects a third water level, data stored in the memory is backed-up to a nonvolatile memory, the third water level being less than the second water level and the third water level being greater than the first water level, and wherein, after the water level sensor detects the first water level and when the water level sensor detects the second water level, power from the backup power source is cutoff after data stored in the memory is backed-up to the nonvolatile memory.

3. The numerical controller according to claim 1, wherein before the water level sensor detects the first and second water levels and when the water level sensor detects a fourth water level, one or more of a report is performed and an alarm is issued, the fourth water level being less than the first and second water levels.

4. The numerical controller according to claim 2 wherein before the water level sensor detects the first, second, and third water levels and when the water level sensor detects a fourth water level, one or more of a report is performed and an alarm is issued, the fourth water level being less than the first, second, and third water levels.

* * * * *